A. O. ROWLEY.
DRAFT EQUALIZER.
No. 175,762. Patented April 4, 1876.
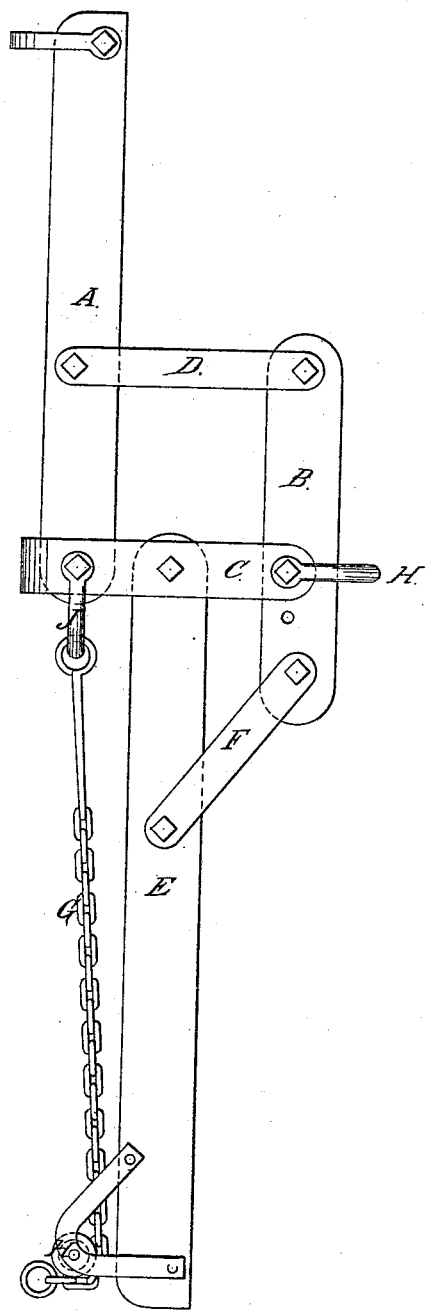

UNITED STATES PATENT OFFICE.

AMOS O. ROWLEY, OF BASSETT, IOWA.

IMPROVEMENT IN DRAFT-EQUALIZERS.

Specification forming part of Letters Patent No. 175,762, dated April 4, 1876; application filed March 6, 1876.

*To all whom it may concern:*

Be it known that I, AMOS ORLANDO ROWLEY, of Bassett, in the county of Chickasaw and State of Iowa, have invented a new and Improved Three-Horse Evener, of which the following is a specification:

My invention is a three-horse evener, contrived so that the single horse may work on the short arms, and the two horses on the long arms, as is required for plowing and working reapers and mowers and the like.

The drawing is a plan view of my improved three-horse evener.

The short arm consists of the compound levers A B, which are pivoted to the strap C in the draft-line, connected together by the links D, and the short one being connected to the long arm E by the oblique links F, which enables one horse hitched to the outer end of the short line A to equal two at the outer end of long arm E; but the oblique links F tend to swing the draft-bar C and the short arm off in a lateral direction, in consequence of which I employ the chains G, connected to the inner end of the short arm, and passing around pulley H, for hitching on the two, which pulls the arm A back, and counteracts the effect of the oblique arrangement of the links E.

The clevis H is for attaching the evener to a plow. When it is to be attached to a wagon, the clevis will be taken off, and a bolt put in its place, and in the tongue, also, another bolt will be put in place of clevis J, which will be taken off, and the chain will be attached to the tongue by a hook.

Having thus described my invention, what I claim as new, and desire to secure by Letters Patent, is—

The compound lever A B, draft-bars C, connecting-links D F, long arms E, and the chain G, combined and arranged substantially as specified.

A. O. ROWLEY.

Witnesses:
 GEO. CHASE,
 A. H. WIGHT.